United States Patent [19]

Pascoal

[11] Patent Number: 5,048,192
[45] Date of Patent: Sep. 17, 1991

[54] WHEEL POSITION GAUGING DEVICE

[76] Inventor: Luis N. Pascoal, Rua Edmundo Navarro de Andrade 1700, Campinas, SP, CEP 13100, Brazil

[21] Appl. No.: 517,586

[22] Filed: Apr. 30, 1990

[30] Foreign Application Priority Data

Sep. 30, 1989 [BR] Brazil .................................. 8904352

[51] Int. Cl.$^5$ ............................................ G01B 5/255
[52] U.S. Cl. .................................................. 33/203.18
[58] Field of Search ............ 33/203.18, 203.19, 203.2, 33/288, 203, 193

[56] References Cited

U.S. PATENT DOCUMENTS 4,285,136 8/1981 Ragan ................................ 33/203.18

FOREIGN PATENT DOCUMENTS 2176618 12/1986 United Kingdom ............. 33/203.18

*Primary Examiner*—Harry N. Haroian
*Attorney, Agent, or Firm*—Christie, Parker & Hale

[57] ABSTRACT

A wheel position, e.g., alignment, gauging device which mounts to a rear sidewall of a tire is disclosed. The device has a tripod, preferably of cast metal, with each of its three legs contacting the outside sidewall of the tire. The legs meet at a flat surface which supports an adjustable plate. A central shaft mounted to the plate is capable of supporting a signal projector used in measuring alignment. Two grippers grab the rear sidewall of the tire and securely hold the device in place, the grippers being attached to the adjustable plate by respective arms. Each arm is rotatably mounted to the plate. Springs are connected to rods which pass through the arms to bias the arms away from the tire. To attach the device, the tripod is placed in position on the outside sidewall of the tire, and handles attached to the arms are used to push the grippers, against the bias of the springs, over the tire's tread so that they grip the rear sidewall. With this construction, the alignment device mounts and is supported by the tire rather than the wheel, so it is unnecessary to lift the car to perform wheel alignment.

10 Claims, 1 Drawing Sheet

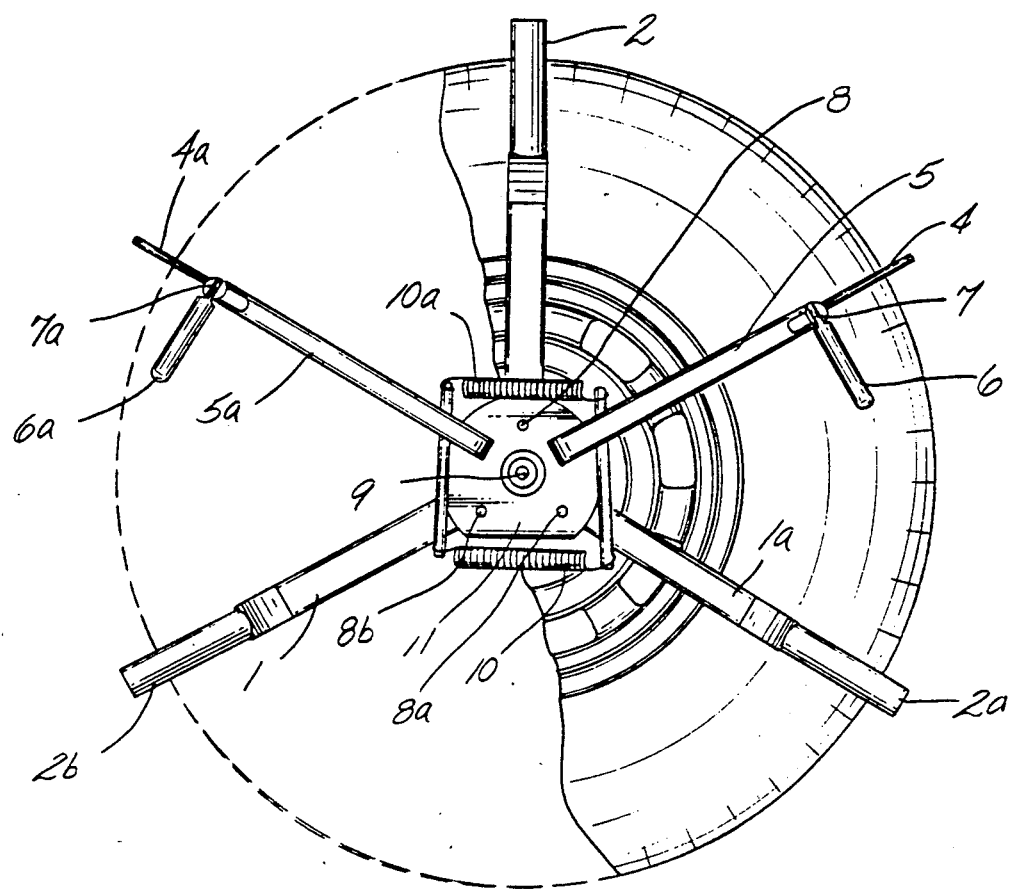
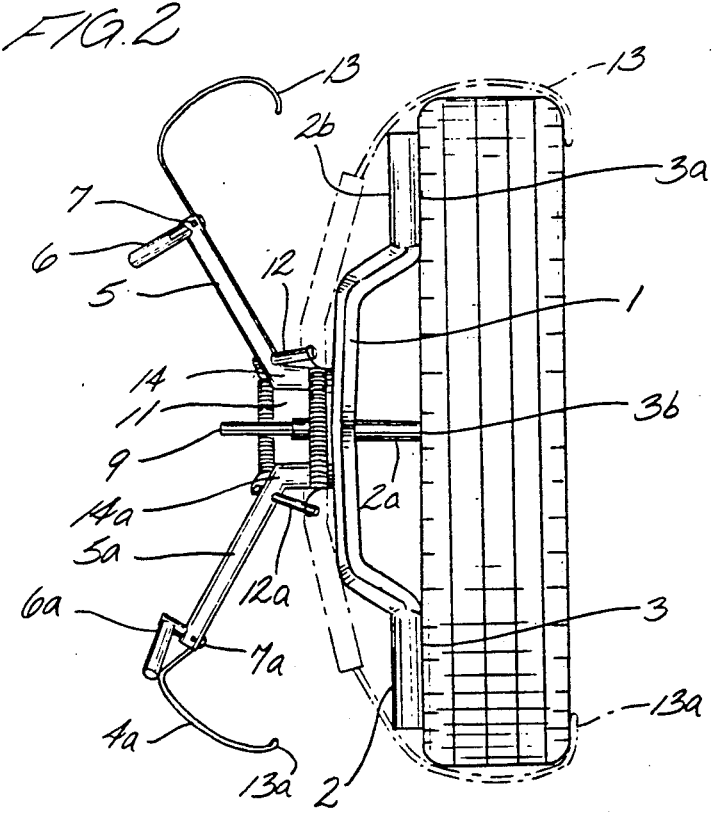

WHEEL POSITION GAUGING DEVICE

BACKGROUND OF THE INVENTION

The present invention relates to a device for maintenance of vehicles, and more specifically, to a device for gauging wheel alignment such as alignment and inclination of a car's front wheels.

The currently used devices, particularly for cars or light cargo vehicles, are mounted on the vehicle's wheels after raising the vehicle off the ground to make sure the device is properly installed parallel to the tire. The operator must find the proper position by trial and error. Therefore, this process is inconvenient. Moreover, gauging is best performed, i.e., most accurate, with the running gear in its original position, but raising the vehicle alters the position of the running gear. Further, raising and lowering the vehicle impacts on the wheel flange, and thus the gauging device, which can result in gauging errors and in permanent deformations of the flange. In addition, mounting the device to the wheel flange requires an expansion and retraction subdevice, as wheel flange diameters vary widely.

SUMMARY OF THE INVENTION

A wheel position alignment measuring device, such as for measuring caster and camber's angle (alignment and inclination), according to the present invention removes the necessity to raise the vehicle, as it is mounted on the tire's inner sidewall Accordingly, gauging is performed while the running gear remains in its working position, and the gauge is mounted to the elastic material of the tire, substantially reducing impact and deformations. Errors in gauging geometry standards are minimized and, in most events, eliminated. Therefore, the device is independent of tire diameter, so there is no need to adjust the device for each gauging operation. With the device mounted to the tire inner sidewall, i.e., around the tire's tread, a geometrically even distribution for measurement is achieved. More particularly, the device is properly positioned with respect to the tire, in contrast to prior devices where trial and error is needed to position the device with respect to the tire, because the device is mounted on the wheel. As the device mounts to the tire sidewall and is independent of tire diameter, there is no need for an expansion or contraction device.

The inventive device achieves a fast, safe, reliable and accurate gauging procedure.

In one embodiment, the geometry gauging device has a cast support, in a tripod shape having three legs for contacting the outside sidewall of the tire and one flat surface where the legs join. This flat surface supports an adjustable plate. The plate has two arms rotatably attached to it, the arms having handles attached to control movement. The distal ends of the arms have tire grippers attached thereto for gripping the inner sidewall on the opposite side of the tire from the tripod. The arms are biased to rotate away from the tire so that the grippers securely hold the inner sidewall. The device parts are interconnected pursuant to high standard technical codes, so as to achieve a high degree of safety and accuracy during operation.

The above and other elements and advantages of the invention will become evident after reading the detailed description and claims in conjunction with the drawings.

BRIEF DESCRIPTION OF THE DRAWINGS

FIG. 1 is a partial front view of the gauging device according to invention; and FIG. 2 is a side view of the device of FIG. 1.

DETAILED DESCRIPTION OF THE PREFERRED EMBODIMENT

With reference to the drawings, the inventive wheel position gauging device has a cast support, having a flat surface 1 and three legs 2, 2a, 2b. The legs adjust to and mount on the tire at its outside sidewall 3, becoming attached to it with the aid of two grips 4, 4a. Grips 4, 4a are fixed on arms 5, 5a which articulate using handles 6, 6a. The handles are self-articulating with respect to points 7, 7a at 90° with respect to arms 5, 5a. The arms are rotatably coupled to an adjustable plate 11, as explained in more detail below.

Flat surface 1 has limiter screws 8, 8a, 8b disposed in a pattern corresponding to that of the legs 2, 2a, 2b. The screws fix the position of plate 11, but enable this position to be adjusted in distance from surface 1. Plate 11 supports a central shaft 9 perpendicularly mounted with respect to surface 1a and the legs and preferably aligned with the wheel axle. Shaft 9 is capable of supporting a signal projector (not shown), as is well known in the art. A spring unit (springs 10, 10a) mounted to adjustable plate 11 works on arms 5, 5a of grips 4, 4a with a compressive spring force and extension calculated to achieve a uniform stress and constant pressure. More particularly, arms 5, 5a rotatably attach to respective rods 12, 12a, at their ends 14, 14a, so that the grips 4, 4a can be pushed (by using the handles) over the tread to grip the rear or inner sidewall 3 of the tire. Even more specifically, the rods 12, 12a pass through holes in the arms 5, 5a, as best shown in FIG. 2, and the arms are rotatably mounted to the plate 11. The arms can also, with the aid of the handles, pull the grips from the rear sidewall to release the device, the arms being biased away from the tire due to the springs.

Wheel geometry gauging is performed once the device is installed. As noted above, the device is mounted on the tire sidewall opposite the sidewall at which the device is located. To install the device, legs 2, 2a, 2b are adjusted and contacted with the outer sidewall of the tire, and grips 4, 4a are frictionally engaged with the tread and inner sidewall to hold the device on the tire. In so doing, the handles 6, 6a are used to compress arms 5, 5a against the springs 10, 10a to move the grips in contact with the rear sidewall. At this point, the device is ready for the gauging operation. To perform gauging, all that is necessary is to couple central shaft 9 with the signalling projector (which has a light source) which is directed toward a calibrated scale on a panel. The scale enables the operator to gauge and thus properly adjust the alignment and inclination of the front wheels (i.e., caster and camber's angles) as is well known in the art.

It should be noted that in the preferred embodiment the three contact legs are positioned at about 0° (straight up), 45° and 315°, because part of the tire between 45° and 315° rests on the ground and thus the tire perimeter is slightly deformed.

In addition, one movable arm 5a is positioned 180° from the 45° leg 2a. The other movable arm 5 is positioned at 180° from the 315° leg 2b. The straight up leg 2 is opposite the center point of contact of the tire with the ground. This positioning of the contact legs with respect to the arms and the ground allows the arms and the ground to press and hold the respective opposing legs in position.

What is claimed is:

1. A wheel position measuring device for use with a wheel position measuring projector, comprising:
   (a) support means for contacting one side of a tire, and for mounting a wheel position measuring projector at a predetermined location with respect to the tire; and
   (b) gripping means having a plurality of arms for holding the support means in contact with the tire by gripping the other side of the tire, and means for connecting the gripping means to the support means so as to bias the arms and thus the gripping means substantially toward a center of the tire to hole the support means in contact with the one side of the tire.

2. A device as claimed in claim 1 wherein the support means comprises a tripod for contacting the one side of the tire, a plate attached to the tripod, and a shaft for mounting the projector.

3. A device as claimed in claim 2 wherein each of the arms has a hook at one end for gripping the other side of the tire.

4. A device as claimed in claim 3 wherein the means for connecting comprises a plurality of rods mounted to the plate, each of the arms having a second end rotatably mounted to the respective one of the rods and a plurality of springs for biasing the rods toward one another.

5. A device as claimed in claim 2 further comprising means for adjusting the distance of the plate with respect to the wheel.

6. A device as claimed in claim 3 wherein each of the arms has a handle for moving it against the bias of the means for connecting to grip the opposite side of the tire to mount the device on the tire, and for moving the gripping means from the tire to detach the device.

7. A device as claimed in claim 5 wherein the means for adjusting comprises limiter screws.

8. A device as claimed in claim 2 wherein the tripod has a flat surface for mounting the plate.

9. A device as claimed in claim 1 further comprising a central shaft mounted to the support means and normal to the one side of the tire, the central shaft being aligned with a central axle of the wheel.

10. A device as claimed in claim 2 wherein the support means comprises a plurality of legs for contacting the one side of the tire.

* * * * *